United States Patent [19]

Maiocco et al.

[11] Patent Number: 4,979,224

[45] Date of Patent: Dec. 18, 1990

[54] INTERACTIVE GRAPHICS SYSTEM AND METHOD FOR MODELLING PHYSICAL ARTICLES

[75] Inventors: Roberto Maiocco; Luciano Basadonna, both of Turin, Italy

[73] Assignee: Digital Electronics Automation, Inc., Livonia, Mich.

[21] Appl. No.: 249,803

[22] Filed: Sep. 27, 1988

[30] Foreign Application Priority Data

Oct. 6, 1987 [IT] Italy ................................ 67848 A/87

[51] Int. Cl.⁵ .............................................. G06K 9/00
[52] U.S. Cl. .................................... 382/8; 364/474.03;
364/474.22; 364/474.29; 364/474.37; 382/22
[58] Field of Search ................................ 382/8, 22, 1;
364/474.03, 474.02, 474.14, 474.37, 474.24,
474.29, 474.31, 474.33, 474.22

[56] References Cited

U.S. PATENT DOCUMENTS

| | | | |
|---|---|---|---|
| 4,703,443 | 10/1987 | Moriyaso | 364/474.03 |
| 4,752,964 | 6/1988 | Okada et al. | 382/1 |
| 4,803,633 | 2/1989 | Kishi et al. | 364/474.03 |
| 4,811,253 | 3/1989 | Johns | 364/474.37 |
| 4,866,631 | 9/1989 | Kurango et al. | 364/474.29 |
| 4,866,643 | 9/1989 | Dutler | 364/474.37 |

Primary Examiner—Leo H. Boudreau
Assistant Examiner—Joseph Mancuso
Attorney, Agent, or Firm—Darby & Darby

[57] ABSTRACT

An interactive graphics system for modelling physical articles, includes a measurement device connected bi-directionally with a central unit to which a video screen and a keyboard are connected, as well as processing media which are suitable for receiving from the measurement device, at least, data on initial model identification points, and for controlling the automatic collection of addition data regarding the model by means of the same measurement equipment in order to provide such data for processing for use in deriving the model.

15 Claims, 6 Drawing Sheets

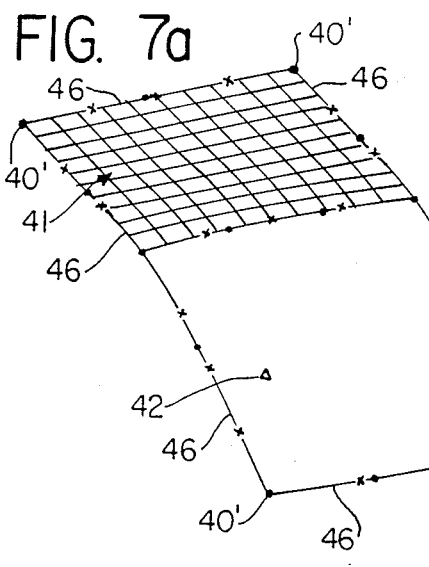
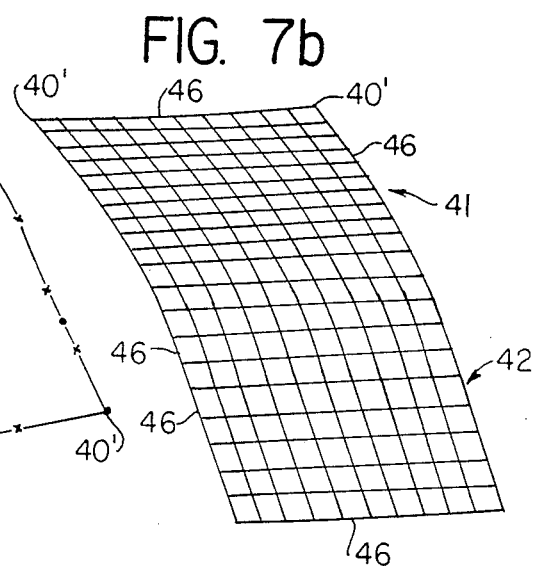
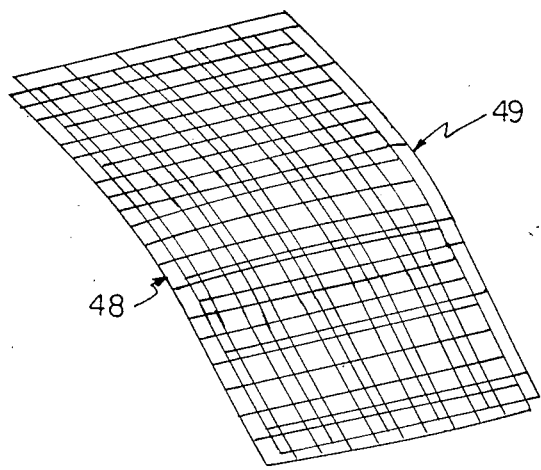
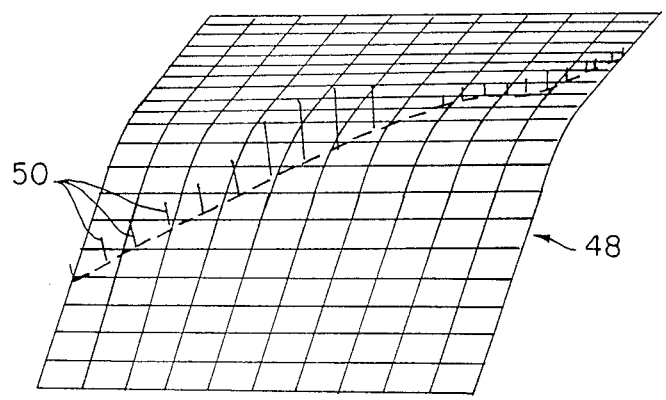

INTERACTIVE GRAPHICS SYSTEM AND METHOD FOR MODELLING PHYSICAL ARTICLES

FIELD OF THE INVENTION

The present invention relates generally to the modelling of physical articles to produce signals describing the articles in a form usable by computer program controlled apparatus, such as machine tools and, more specifically, concerns an interactive graphic system and method for modelling physical articles by means of the digital encoding of surface areas and computer projection of portions outside a figure or which may not be included in the article itself, but may be necessary for a mold, or the like.

BACKGROUND OF THE INVENTION

As is well known, particularly in the field of design, computerized modelling, and publishing, the problem of obtaining a program for controlling machine-tools often arises, for example, in the manufacture of a die by working with a numerical control profile-copying machine directly on a model of the article to be produced. If the model is a physical reproduction of the article, the program should be generated by means of digital encoding of the model itself. In that case, the fundamental requirement is to achieve rapid and reliable digital encoding. A typical application for program processing is that of producing the two halves (male and female) of a die directly from a single digital encoding of the model.

Depending on the technical specifications, one of three methods has typically been used: the profile-copying method; the data collection and storage method; and the method involving digital encoding with a measuring device. However, all these methods present various problems which limit the advantages of their utilization, including those discussed below.

The profile-copying method has the advantage of not requiring dedicated digital encoding equipment. This is because a probe is utilized on the manufacturing equipment, scans the surface of the model, and provides direct control of the profile-copying machine. However, this method has the disadvantages of producing only one die for each scan of the model, of having the speed of the profile-copying machine limited by the relatively slow scanning speed of the probe, and of having the precision of scanning reduced by vibrations associated with the manufacturing process. The profile-copying method is also unable to compensate for the shape and the errors of the probe, since the fabrication process proceeds simultaneously with the data collection phase.

As a result, it is necessary to change the probe and repeat the model scanning procedure for each phase of the fabrication process.

The data collection and storage method also uses a profile-copying machine as its basic equipment, but the process is divided into two parts: digital encoding and fabrication. A device control unit actually controls the first process, digital encoding of the model, using a profile-copying machine and its probe at the highest speed allowed by the probe itself, and the results are stored on a data storage disk. The same unit subsequently controls the machine during the milling phase at the maximum speed allowed by the machine tool, utilizing the data stored previously. In this instance, the scanning phase represents 20-30% of the total time for the process, and the data collected from the model may be used for several fabrication sequences. However, the use of the profile-copying machine for scanning the model, thereby diverting it from the fabrication process, is not efficient or cost-effective.

The method involving digital encoding with a measuring device uses a dedicated machine to digitally encode the model and to generate the program for controlling further profile-copying. The scanning data is processed by a computer which optimizes the cutting path and derives the programs for roughing out, preliminary finishing, and finishing from the same set of scanning data. The same measuring device can then be used to control the dimensions of the final product. With this method, maximum utilization of machine tools is achieved, since they can function continuously at maximum capacity. One of the principal limitations of this method is the low speed of digital encoding, owing to the need to capture all the details required for precise control of the profiling machine during the finishing phase, and owing to the need to rotate the probe. Also, the cost of the system is high, owing to the dimensions of the machine and of the probe configuration; and the precision is low, owing to the impossibility of adjusting for the dimensions of the probe in space. The process is also relatively incomplete, permitting processing only of the data received from the physical model. However, this last limitation is shared by all the other methods described above.

It is an object of the present invention to obviate the above-indicated shortcomings in known systems for modelling physical articles. These shortcomings are primarily limitations in effectiveness due to the slowness of the digital encoding process, insufficient processing capacity for the data collected, and the inability to interface on-line with projection (e.g. through extrapolation) and manufacturing systems supported by a (CAD/CAM) computer for the definition of parts of the die which are not present in the physical model.

In accordance with the present invention, an interactive system for modelling physical articles includes a measuring device, and processing means. At least initial identification data for the article are provided via the measuring device to the processing means, and the processing means produces automatic signals to control the measuring device in acquiring additional data regarding the model. The processing means utilizes the data to generate a model representing the article shape and dimensions in the form of signals usable for program controlled apparatus, such as machine-tools.

In accordance with the method of the invention, the surface of the article to be modelled is divided into one or more areas called "patches", for example, by the operator specifying a set of control coordinates roughly defining the boundary of each patch. The machine is then operated to control the probe so as to acquire measurements at additional points necessary to define the boundaries with a specified degree of accuracy, and the boundaries are modelled with a set of contour-defining equations which minimize the deviation from the measured points. Thereafter, the surface of each patch on the article is measured at selected points, the results are compared to the values derived from the modelling equations at the same points, and the equations are modified to minimize deviations of the model from measured points. This process of measuring, comparing measured points with the model, and refining the model continues, until a model with a desired degree of accuracy is derived by successive approximation.

BRIEF DESCRIPTION OF THE DRAWINGS

For a better understanding of the present invention, a preferred method for its implementation is described below, for the sole purpose of providing a non-limitative example, with reference being had to the accompanying drawings, in which:

FIGS. 4 through 12 are illustrative examples of the digital encoding of superficial dimensions using the invention.

DETAILED DESCRIPTION

Figure 1:
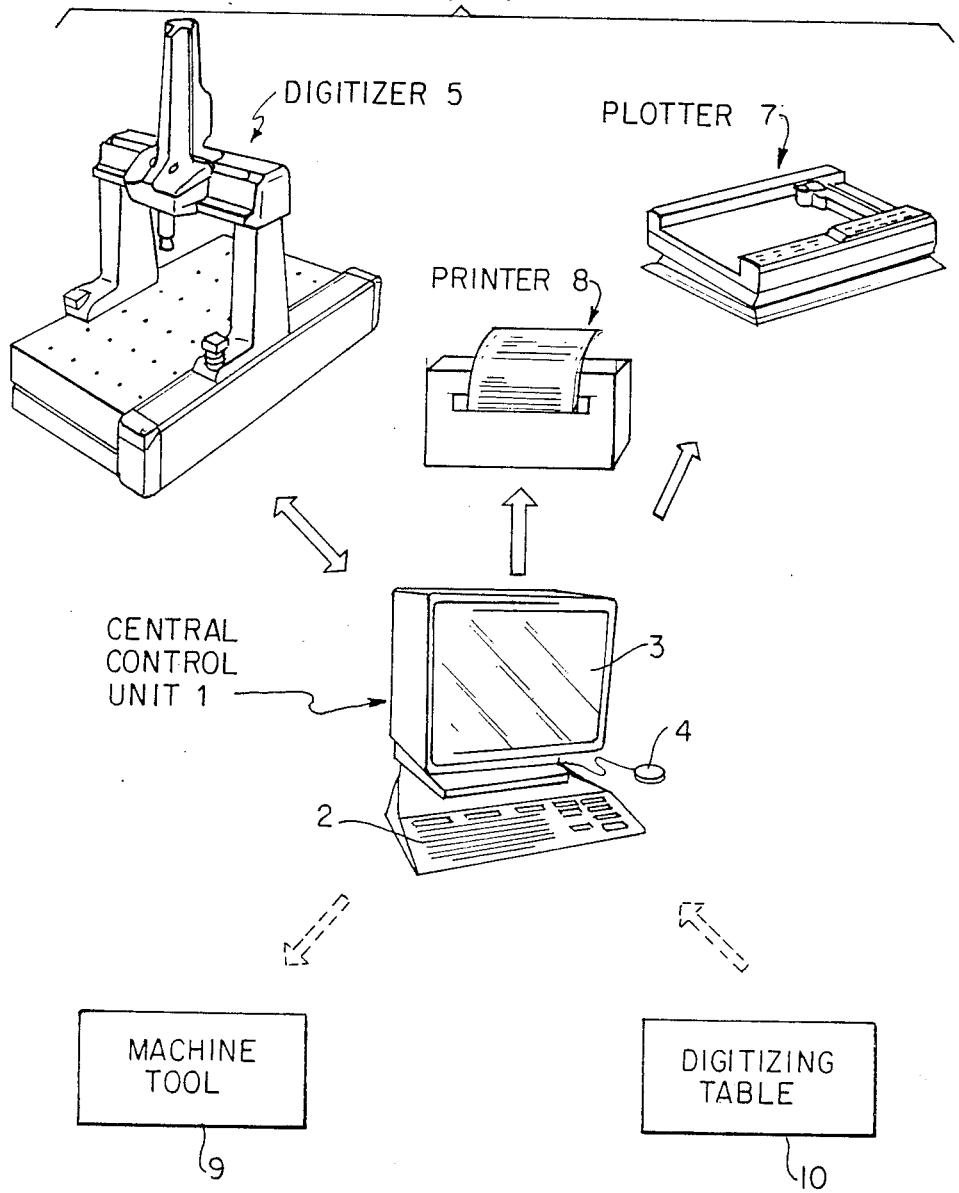
FIG. 1 is a schematic illustration of the components which make up a preferred system embodying the present invention.

With regard to Figure a central processing or control unit 1 includes processing media and conventional communication media for use with an operator interface, such as a keyboard 2, a video screen 3, and an indicating component 4 (e.g. mouse) for the selection of data or lines on the screen 3. The central control unit 1 may include a conventional 15 graphics work station, composed of a 32 byte computer system on which an optional (CAD/CAM) computer-assisted projection and manufacturing module may also be installed, for example, a Selenia-Autotrol (S 7000), which is capable of high level mathematical projection and three-dimensional modelling functions.

The central control unit 1 is linked bidirectionally with an automatic three-dimensional digitizer 5, comprised of a measuring device of a well-known type, equipped with a mobile measuring head mounted on a motorized carriage capable of precise movement along three orthogonal Cartesian axes. Such measuring devices are commercially available, for example, under the trademark IOTA from Digital Equipment Automation, Inc. of Livonia, Michigan. The carriage carries a tracer point or probe 6 of the point to point type. A sensor 11 provides sensitive manual control of the motion of the measuring head and permits the manual collection of data on an article being measured. The unit is, in addition, linked unidirectionally to the tracing element on a conventional plotter 7, and to a printer 8.

The central control unit 1 is linked unidirectionally with a machine tool 9, for example, a profile-copying machine, and unidirectionally receives data from a figure-digitizing table 10.

Figure 2:
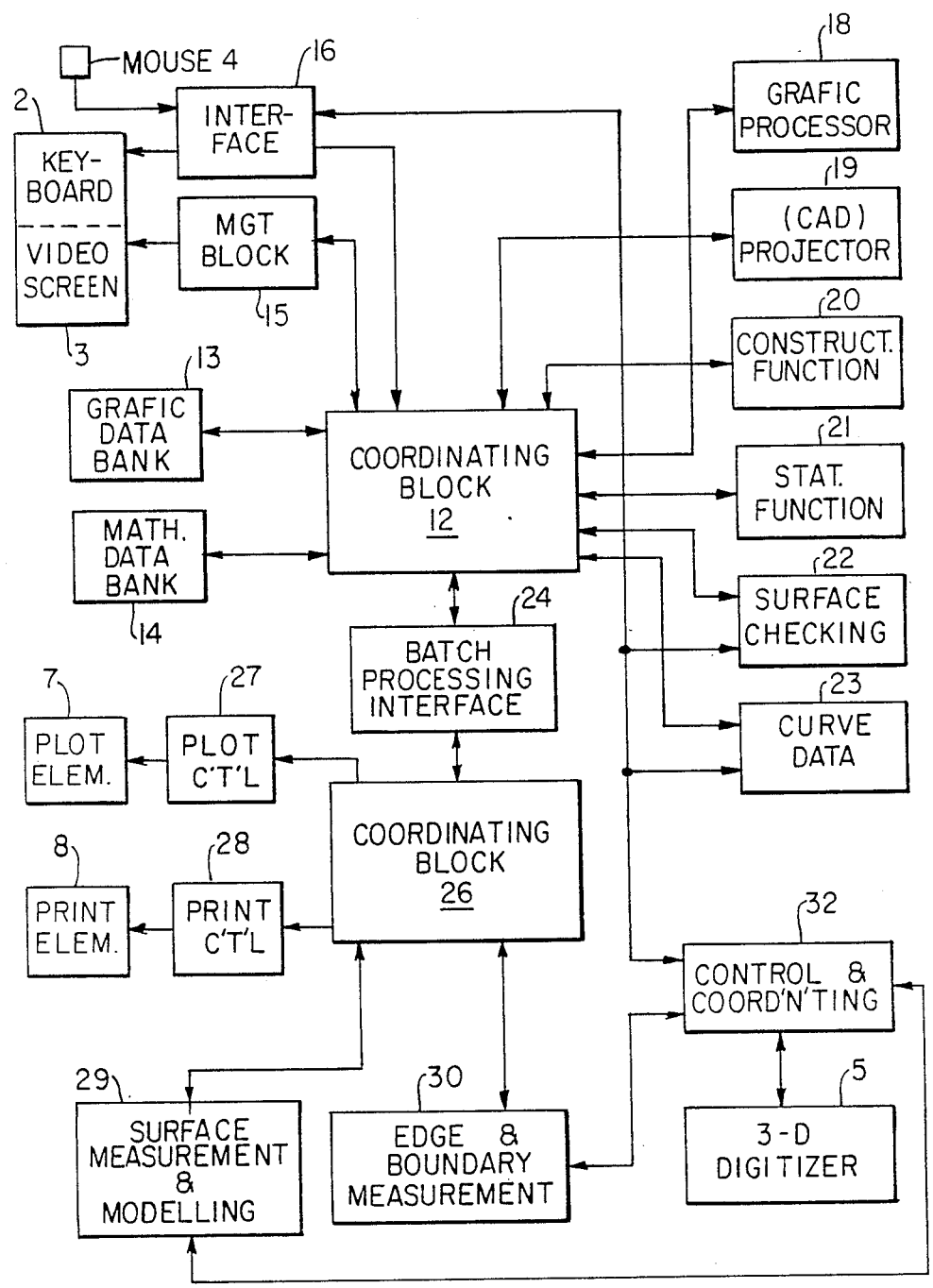
FIG. 2 is a functional block diagram of the principal processing unit for the system in FIG. 1.

In FIG. 2, block 12 is the principal coordinating block for the functions of the central control unit 1, which is linked bidirectionally with:

Data banks 13 and 14, graphic and mathematical, respectively;

A data management block 15 on the video screen 3;

Block 18 relating to conventional graphic processing functions;

Block 19 relating to conventional (CAD) computer-assisted projection functions, including for example: functions for producing overall transitions (smoothing) between contiguous areas (patches) by maintaining either the continuity of the tangent or the continuity of the curvature of the surface lines; functions for producing connecting surfaces (blending) between patches which are close but not contiguous, in order to fill in the empty spaces left by the reconstruction process while maintaining the uniform characteristics of the surfaces; functions to produce filleting between patches which are close but not immediately alongside each other, and for which such a juncture is designed;

Block 20 relating to dedicated construction functions, such as, for example, interactive optimization of the poles of the model, the definition of areas to be excluded, the construction of the boundaries of the model, and the construction of a surface fitted to the boundary curves;

Block 21 relating to descriptive statistical functions for measurement deviations;

Block 22 relating to functions for checking the surfaces described by a mathematical model;

Block 23 relating to the acquisition of primary data on the curves of the edges; and Block 24 of the batch processing interface, which is linked bidirectionally with another principal coordinating block 26 for system functions and a batch processing distributor.

Block 12 is also linked unidirectionally from an interface block 16 with the system's operator terminals, which in this specific case include the keyboard 2 and mouse 4.

A coordinating block 26 is linked:
unidirectionally with the control block 27 for the plotter 7;
unidirectionally to a control block 28 for the printer 8; and
bidirectionally with two blocks, 29 and 30 respectively, for the automatic measurement of the actual surfaces and the creation of the mathematical model, and for the automatic acquisition of data on the edges and on the construction of the boundary curves.

These two blocks 29 and 30 are, in turn, connected bidirectionally with a block 32, which is the control block for control of, and communication with, the measuring device 5, with which block 32 is bidirectionally linked.

Block 32 also carries out the same coordinating function as block 26, and is connected bidirectionally with the operator communication block 16 and with blocks 22 and 23.

All of the individual functional blocks discussed with reference to FIG. 2 represent functions that are conventionally done in CAD or machine control systems and are well-known. It is therefore not believed to be necessary to describe the details of these blocks.

The automatic mathematical reconstruction of the surfaces of the physical article by means of the present invention is preferably performed with a (CAD) computer-assisted graphic projection module, which interacts automatically with the measuring device. Reconstruction occurs by means of the following steps, which will be described both in terms of the operating blocks from FIG. 3, as well as with reference to FIGS. 4 through 12.

The operator initially divides the surfaces of the article into areas called "patches", and indicates the boundaries of the surface itself. At this stage, an experienced operator can facilitate efficient model generation by selecting the patches appropriately. Specifically, the boundaries of the patches can be selected to assure that the unusual features of the article are modelled rapidly.

Subsequently (indicated by block 60 in FIG. 3) making use of, for example, the sensor of the measuring device 5, the operator manually controls the acquisition of the control coordinates for the curves of the patch edges. These include, for example, the vertices of the patch itself. In FIG. 4, the control coordinates of the patch vertices are shown by means of small square-shaped points, and they are identified with the number 40, the patches being indicated by the numbers 41 and 42. With reference to FIG. 2, the acquisition of control coordinates with the measuring device 5 is achieved by collecting the information in block 32, and storing it in block 23.

Figure 3:
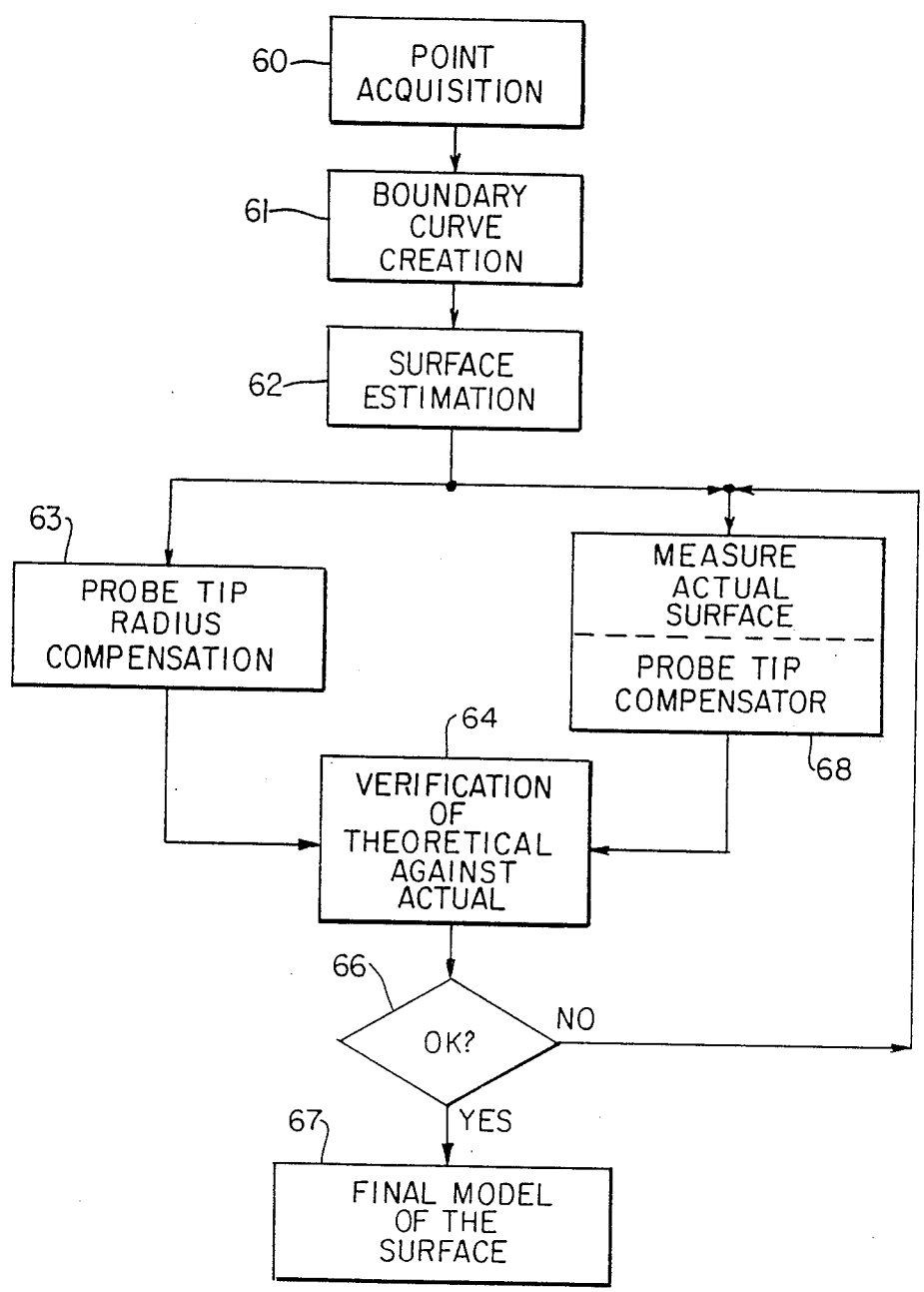
FIG. 3 is a block diagram and flow chart for this system.
Figure 4:
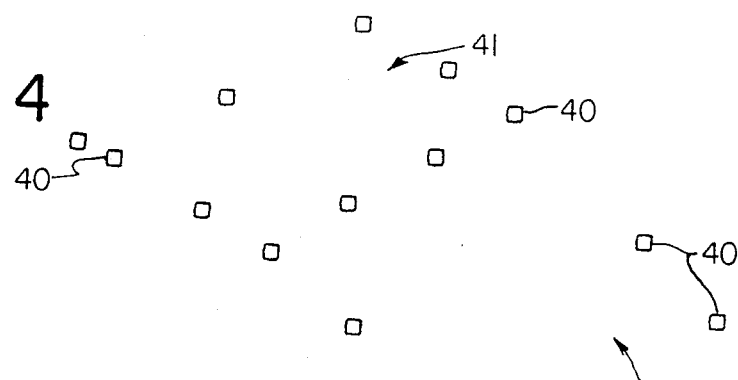
Figure 5:
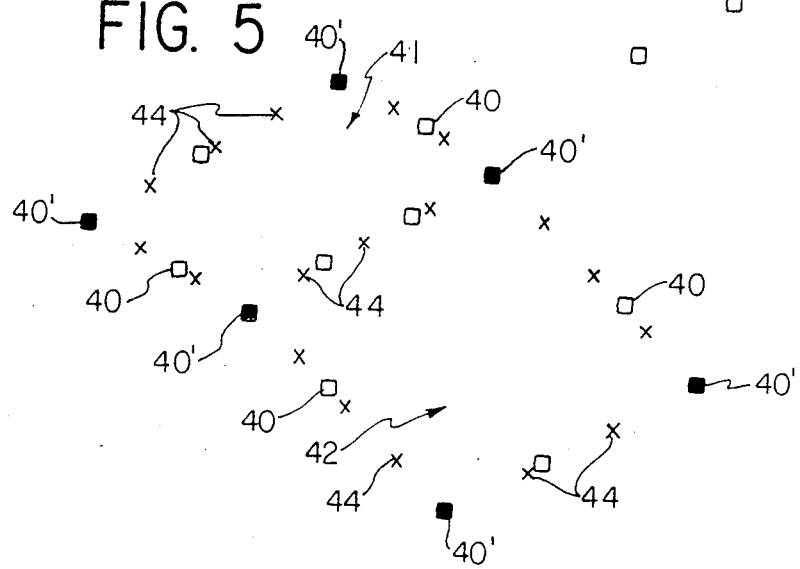

With reference to FIG. 3, after block 60 has completed acquisition of these control coordinates (for example, by means of a signal furnished by the operator), block 61 controls the automatic acquisition by the measuring device 5 of boundary points on the physical model. These boundary points define, with the necessary precision, the boundary curve for all sides of the patch. The number of points is defined by the operator by requesting a specified level of precision, while their position is determined automatically by the system. With reference to FIG. 5, the points collected automatically from the measuring device 5 along the boundary curves of the physical article are shown with an "x" and identified with the number 44. With reference to FIG. 2, block 26, controls this automatic acquisition of the coordinate points 44 by means of block 30 and through block 32. Block 12, by means of block 15, controls the graphic display on the screen 3 of points 40 and 44 collected by the probe 6 and indicated by "x" marks in FIG. 5.

In the second phase, block 61 continues to control the automatic construction of the patch boundary curves, by means of the construction of Beziers curves which approximate the boundaries of the patch, using, for example, Beziers formulas up to the 21st degree. These Beziers curves are calculated to minimize deviations in relation to the points 44 collected from the physical model with the measuring device 5, and they are adapted to these points to create flexible outlines which minimize deviations. They require a smaller number of points and result in a faster and more flexible technique compared to that which uses simple interpolated curves in order to connect the digitally encoded points. However, those skilled in the art will appreciate that the use of Beziers curves is not essential to the invention and that other types of contourmodelling equations, such as Fourier Transforms, may be utilized.

Figure 6:
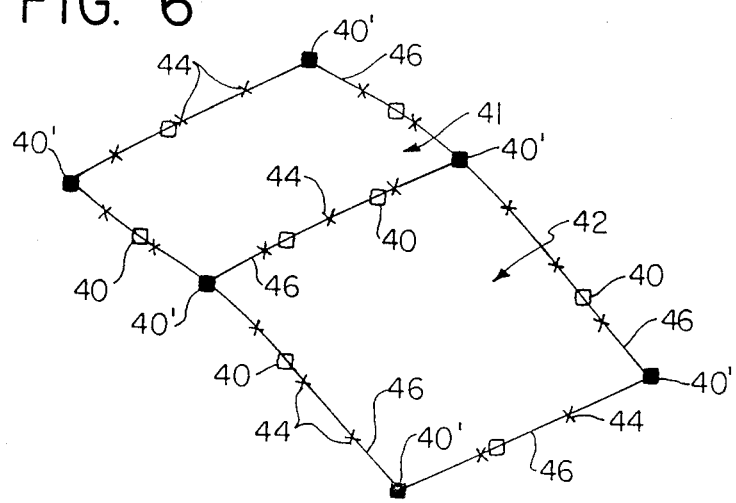
Figure 10:
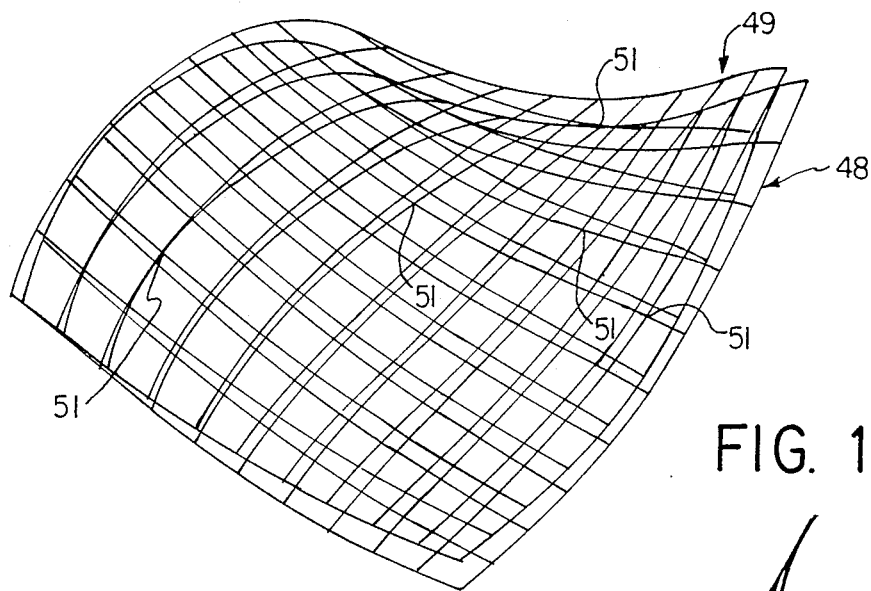

With reference to FIG. 6, the boundary curves for patches 41 and 42 are indicated by the number 46 and are calculated between the control points 40. The latter are displayed by means of block 15 (FIG. 2) on the video screen 3, by the operator's preliminary selection requesting the construction of the curves 46 between points 40, chosen by means of the element 4. The construction of these boundary curves 46 is initiated and controlled from block 30.

With reference to FIG. 3, the process then moves from block 61 to block 62, which controls the automatic mathematical construction of a closely approximated and closely fitted surface which is based on the boundary curves of the patch, which were previously calculated in block 61. FIG. 7a illustrates the graphic display of such a construction for a single patch 41, while FIG. 7b is a complete graphic display of both patches 41 and 42, as it appears on the video screen 3 by means of block 15 (FIG. 2).

The points 44, which are collected by the probe 6 on the measuring device 5 and are used to construct the boundary curves 46 of the patches, do not actually lie on the surface of the physical article, but rather correspond to the position of the center of the tip of the probe (which is usually a sphere). Thus, the mathematically constructed surface is in reality out of alignment with the actual surface of the article. The control unit 1 of the present invention automatically reconstructs the actual surface of the model by applying, in a precise, manner a procedure for adjusting three-dimensionally for the dimensions of the probe. This can be done from the moment the control unit 1 itself knows the standard locating vectors of all the points on the Beziers surface which has been generated; it can then calculate the adjustment for the probe's dimensions in all directions. This method for adjustment of the surface data collected is advantageous compared to the conventional technique of applying the adjustment for the dimensions of the probe directly to the data collected for the measuring device in the scanning stage.

With reference to FIG. 3, from block 62 the operator can decide whether to directly order this phase for adjustment of the mathematically calculated surface, or instead order the automatic acquisition of internal points on the patch by means of the measuring device. This choice is generally made on the basis of the amount of irregularity the model has on the inside of the patch, the irregularity consisting in practice of pronounced variations in the curvature of the surface. In the event that such irregularities are minimal, and assuming that the first procedure is chosen, the process moves from block 62 to block 63, which controls the mathematical construction of the surface adjusted for the error due to the dimensions of the probe 6. This compensated surface, along with the fitted surface constructed in block 62, is displayed on the screen 3 by means of block 15 (FIG. 2), and can be seen in FIGS. 8 and 10, in which these two surfaces are identified respectively with the numbers 48 and 49.

From block 63 (FIG. 3), the process moves to block 64, using the measuring device 5, which controls the automatic checking of the deviation between the actual surface of the article and the mathematically constructed and adjusted surface. It measures several significant points, which are defined by the central control unit 1 or by the operator, who in turn controls block 32 for communication with the measuring device 5. At the same time, the statistical processing of the results of the measurements, the data on the maximum or minimum deviation found, the points corresponding to any such deviations, and the mean value of the deviations, is performed in block 21. The graphic display of the results of this check is initiated by block 15 on the video screen 3, and is indicated schematically in FIG. 9. In the figure, the deviations from the actual surface of the model are indicated on the compensated surface 49, are represented by vectors 50 which start from the surface 49 and end on the points collected from the physical model, and are amplified according to the scale selected by the operator.

Figure 11:
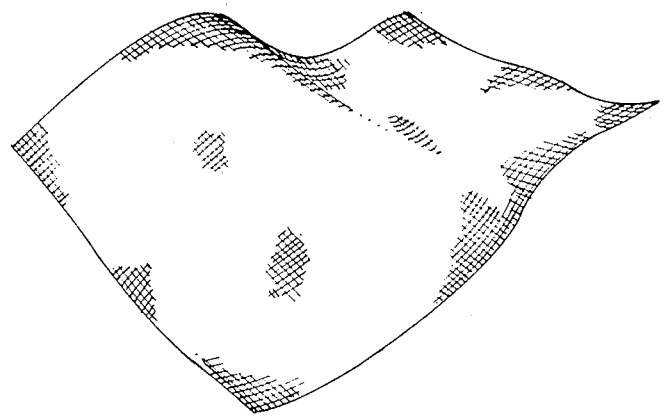

From block 64 (FIG. 3), the process moves to block 66, which evaluates whether the deviations between the actual surface of the article and the mathematically constructed surface, which were collected by block 64, are within predetermined limits. These limits can be fixed by central control unit 1 or, instead, defined and checked by the operator. In the event of a positive result (i.e. the mathematical construction of the model is sufficiently precise), the process moves to block 67, which controls the production of the final mathematical model, the display for which appears on the video screen 3 and is illustrated in FIG. 11. The coordinating block 12 (FIG. 2), through the conventional functions of blocks 18 and 19, provides for the cutting, trimming, filleting, and similar operations, which do not require direct scanning of the article or which are outside the figure.

In the event that the deviations between the actual surface of the article and the mathematically constructed model exceed the predetermined limits, the process moves from block 66 (FIG. 3) to block 68, which controls automatic measurement of the actual surface of the article, using the measuring device 5, and the creation of a mathematical model of the surface in a fashion analogous to that described above relative to the operations in adjustment block 63. In particular, block 29 (FIG. 2) initiates the automatic acquisition of internal points on the patch, according to three alternative automated approaches which may be selected by the operator. Points to be collected from the article are automatically defined by the system according to two different algorithms. The first algorithm, based on the collection of a limited number of points and on the interpolation of these points into shapes, guarantees a faster process, but is less precise. The second algorithm requires a greater number of points and operates directly through a superficial interpolation, following a slower, but more precise process. Block 29 then initiates the reconstruction of the surface of the part, taking into account the additional constraints posed by points or shapes collected inside the patch.

The process moves directly to block 68 from block 62, in the event that irregularities are found on the inside of the patch which do not permit the presumption of a good approximation of the actual surface of the article by the mathematical construction of the fitted surface and the boundary curves.

From block 68 the process then moves to block 64, which initiates a check of the deviations between the compensated mathematic model and the physical article, as has already been described.

Block 67, has the capability of initiating a direct automatic comparison between the final mathematical model and the actual surface of the article, using the measuring device 5.

Using the plotter 7, block 27 (FIG. 2) controls the execution of the final mathematical model, following the various display modes which can be obtained with the conventional projection functions of a (CAD) computer, while block 28 initiates the printout on the printer 8 of the data collected, for example the data on the check conducted by block 64.

In any phase of system operation, the operator may request data displays or the reconstruction of surfaces on the video screen 3 or on the plotter 7.

Figure 12:
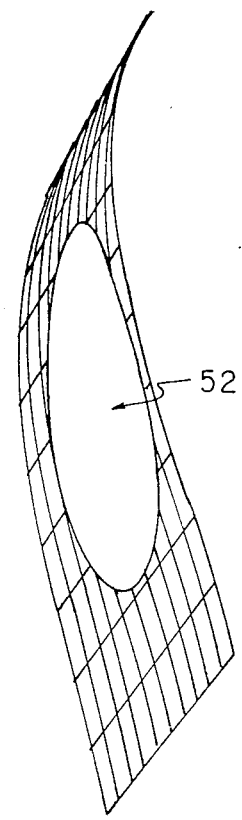

Furthermore, as can be seen in FIG. 12, in the final mathematical model which represents the physical article, there may be defined one or more zones (islands) on the inside of the patch for which, under the control of block 20 (FIG. 2), no reconstruction occurs, because they are parts of the article for which reproduction is not desired, or areas into which elements not present during the collection process must be inserted subsequently.

The central control unit 1, working from the final mathematical model, and using a standard (S7000) CAM software module, may then in a conventional manner generate the numerical control programs required for the manufacture of the part, which programs can be used for the command and control of the machine tool 9. The operator can then, in conventional mode, display on the screen 3 of the central control unit 1 the operating path of the machine tool 9, and may modify it in interactive mode, thereby avoiding the necessity of carrying out series of tests on the machine.

The advantages achieved by the present invention are obvious from the present description. In fact, it is proposed as a means of projecting objects with sculptured surfaces for which a purely mathematical projection by means of conventional (CAD) equipment has proven inefficient. This is the case in the projection of designs which are derived from a physical article constructed by the designer, or from a projection generated by modifications to a prototype during the process of functional experimentation, or arising from production requirements.

This invention's system for the expression of physical models in mathematical terms is interactive, automatic, and optimizes the utilization of the measuring device, which is controlled in automatic mode by the collection of only the points which are necessary and sufficient for the process. It furthermore integrates the functions of a conventional CAD/CAM with those of a measuring device seen as an intelligent peripheral of the work station, and it therefore provides for a truly comprehensive solution to the problems of the CAD design of print media, whether defined by means of a mathematical, physical, or mixed model. The process of definition, until a final mathematical model is reached, takes place in a program loop until the desired level of accuracy is attained, and a continuous process for checking accuracy in the form of deviations between physical and theoretical coordinates is integrated into the cycle of mathematical expression of physical models in such a way as to furnish at every step a reliable indication of the quality of reconstruction.

Blocks 30 and 29, by means of block 32, manage the control of movements of the measuring device 5 and the acquisition of dimensional data in real time, for the purpose of collecting data on the surfaces and curves of the physical article. These processes are regulated by a system of pre-established priorities. Block 26 provides for the interruption of a process in operation and the execution of another which has a higher priority level. This approach provides the maximum utilization of the measuring device, in that it makes it possible to enter more curves and surfaces into processing and to make the machine operate autonomously, both while the central control unit 1 is being used for the management of other processes, and during down time.

It is therefore clear that the manner of implementation of the invention described above may be subject to modifications and variants which do not depart from the scope and spirit of the inventive concept it involves. Moreover, the central control unit 1 may be connected to any optional (CAD/CAM) computer-assisted projection and manufacturing module. Likewise, the initial acquisition of the control coordinates for the part may also be done in automatic mode, by means of automatic data collection media. Also the central control unit 1 can manage the reconstruction process by means of manual measuring devices controlled by miniprocessors and equipped with a point guidance system. In this instance, the operator of the device is instructed by the central control unit 1 as to the individual points to be collected, while the remaining operating process remains the same as that for the configuration with the automatic measuring device. In addition, the initial mathematical construction of the model's surfaces can likewise be defined either by collection of control coordinates or by points along the edges, and may be supplied to the central control unit 1 by external CAD or by means of a digitizing table 10.

Alternatively, the system for this invention may include a group of measuring devices 5 controlled by only one central control unit 1, with the sole limitation that the video screen 3 can only display the model reconstruction data being collected by one measuring device at a time.

What is claimed is:

1. An interactive system for modelling a physical article in mathematical terms, comprising a measurement device for taking measurements of said article, and processing means coupled to said measurements device so as to receive data on initial identification points on the article for providing automatic signals to control said measurement device in the collection of data on additional points on the article, said processing means constructing a model from all of said data;

said processing means including equipment for the mathematical construction of boundary curves connecting said initial identification points for said model, equipment for the mathematical construction of a surface fitted to the boundary curves, and means for determining data collection errors due to the dimensions of said probe of said measurement device and means for mathematically constructing, on the basis of a mathematically defined surface, a second surface free of said data collection errors.

2. A system in accordance with claim 1, wherein said measurement device comprises a probe for the collection of points on the physical article, and the positioning of said probe is automatically controlled by the automatic signals from said processing means.

3. A system in accordance with claim 1, wherein said measurement device comprises a probe for the collection of points on the physical article, and the automatic signals supplied by said processing means control the positioning of said probe for the collection of said additional points.

4. A system in accordance with claim 1, wherein the data on the initial identification points for the model are supplied by said measuring device.

5. A system in accordance with claim 1, wherein the data on the initial identification points for the model and supplied by digital data processing means.

6. A system in accordance with claim 1, wherein said processing means include equipment for the mathematical construction of a surface for said model, on the basis of the fitted surface and within the boundaries set by said additional points, which where collected for said physical article.

7. A system in accordance with claim 1, wherein said processing means include equipment for the detection of deviations between said mathematical construction of the surface of said article, and the corresponding surface of said physical article.

8. A system in accordance with claim 7, said deviations are between the corresponding points of said surfaces.

9. A system in accordance with claim 7, wherein said processing means include equipment for the statistical display of said deviations.

10. A system in accordance with claims 7, wherein said processing means include means for checking whether or not said deviations fit within a predetermined field.

11. A system in accordance with claim 1, wherein said processing means include equipment for the interactive approximation of curves and surfaces, based on calculations using Bezier formulas.

12. A system in accordance with claim 1, wherein said processing means are connected to display means and to communication means for an operator.

13. A system in accordance with claim 1, wherein said processing means include means for connection to an electronically controlled machine tool.

14. A method for modelling physical articles in a form usable by a program-controlled apparatus, said method being performed with measurement means capable of measuring points on the article, said method comprising the steps of:

a. defining an area to be measured on said article by specifying to said measurement means a set of control coordinates roughly defining the boundary of said area;

b. operating said measurement means to acquire measurements at additional points necessary to define the boundaries with a specified degree of accuracy;

c. modelling the boundary with a set of contouring defining equations so as to minimize the deviation thereof from the measured points;

d. operating said measurement means to acquire further measurements at selected points on the surface of said article;

e. comparing the acquired further measurements with values derived from the modelling contour-defining equations at the same points; if the deviations are within predefined limits, stop, otherwise go to step f; and f. modifying the contour-defining equations to minimize deviations of the model from measured points and returning to step d.

15. In a system for modelling physical articles in a form usable by a program-controlled machine, said system including measurement means capable of measuring points on the article, said system comprising:

a. means for defining an area to be measured on said article by specifying to said measurement means a set of control coordinates roughly defining the boundary of said area;

b. first means for operating said measurement means to acquire measurements at additional points necessary to define the boundaries with a specified degree of accuracy;

c. means for modelling the boundary with a set of contour-defining equations so as to minimize the deviation thereof from the measured points;

d. second means having an enabling input and being responsive to a signal received at said enabling input for operating said measurement means to acquire further measurements at selected points on the surface of said article;

e. means for comparing the acquired further measurements with the values derived from the modelling contour-defining equations at the same points; said comparing means stopping further operation if the deviations are within predefined limits, and otherwise producing a continuation signal; and f. means responsive to said continuation signal for modifying the contour-defining equations to minimize deviations of the model from measured points, said means for modifying producing a control signal applied to the enabling input of said second means for operating so as to enable the same to acquire further measurements.

* * * * *